Figures 1, 2:
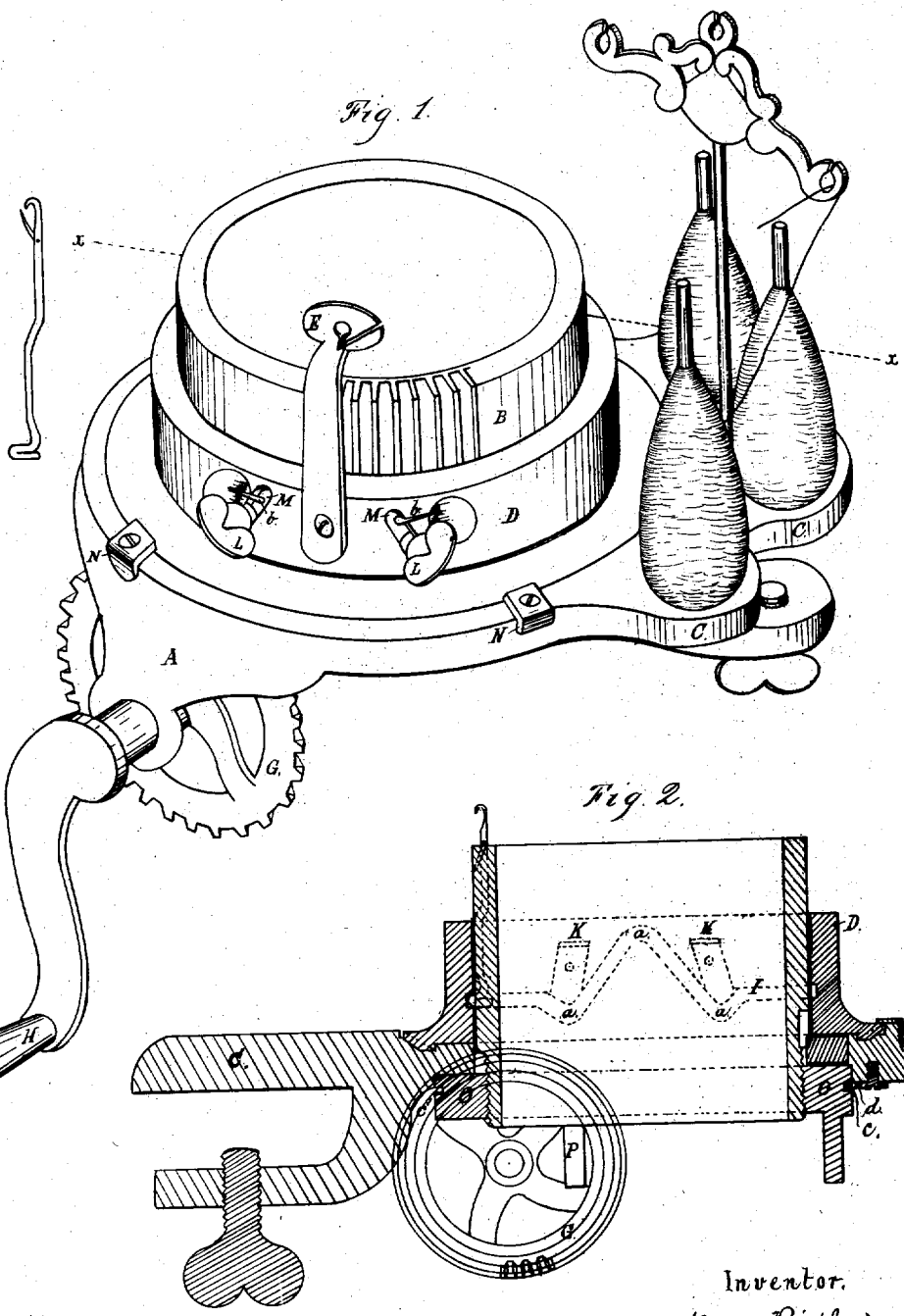

D. BICKFORD.

Knitting-Machine.

No. 6,423. Reissued May 11, 1875.

Witnesses.

Geo. T. Smallwood Jr.

Wm Johnson

Inventor.

Dana Bickford.

By John J. Halsted his Atty.

UNITED STATES PATENT OFFICE.

DANA BICKFORD, OF NEW YORK, N. Y.

IMPROVEMENT IN KNITTING-MACHINES.

Specification forming part of Letters Patent No. 80,121, dated July 21, 1868; reissue No. 6,423, dated May 11, 1875; application filed April 5, 1875.

*To all whom it may concern:*

Be it known that I, DANA BICKFORD, of the city, county, and State of New York, have invented certain Improvements in Knitting-Machines for Family Use; and I do hereby declare that the following, taken in connection with the drawings which accompany and form part of this specification, is a description of my invention sufficient to enable those skilled in the art to practice it.

My improvements relate to knitting-machines, but more particularly to that class in which a circular series of needles reciprocate vertically while forming the stitches.

The objects of my improvements are to make such machines much simpler and with fewer parts than heretofore, and yet render them capable of producing a greater variety of, and more uniform and perfect, work than could be made upon circular machines as heretofore constructed; also, to make them capable of being instantly reversed from and to any point in the circle, and to knit freely in either direction to any desired extent, and yet to deliver the yarn properly to the proper needles, so as to make either flat or tubular goods, or both connected, as in forming the various parts of a stocking, or other shaped or "fashioned" article, and without the employment of any pattern-cylinder or equivalent device to determine such shape; to narrow or widen at will either the tubular or the flat fabric produced, without change in the size of the needle-cylinder; to make on such circular machine fabric with different-colored stripes running lengthwise of the tube or strip, or with such stripes themselves varied by having different colors running crosswise of the same, so as to present in each stripe a cross-stripe or block; also so as to make fancy goods of different or varying texture, by employing at times all the needles of the series, and at other times a lesser number than the whole series, by revolving the cylinder in either direction; and, in addition, to make ornamental fringe or cord, and to cover by knitting around a core, whether the same be a wire, cord, flat spring, whip-handle, or other article, by feeding these articles into the center of the knitting; and also to make a wide variety of articles of apparel, either tufted, piled, or plain, never before, it is believed, produced upon a knitting-machine of any kind.

My primary object is, by simplifying and cheapening the cost, while enlarging the range and capacity, to supply the great and daily-increasing want of and demand for a family machine that may occupy the same position in the household with regard to knitted goods that the sewing-machine now does with regard to sewed goods; it being well known that the so-called family machines, as heretofore constructed, were either limited to the mere knitting of a tubular goods of a corresponding size to the diameter of the needle-cylinder, or they were so complicated as to require a practical mechanic to run them and keep them in order.

To accomplish these important ends, my improvements consist, mainly, in forming the cam-cylinder with a continuous needle guide or groove having equal depressions and elevations, their construction being such as to act the same upon the needles in either direction that the cylinder may be revolved; and in combining with such cam-grooves devices for varying the degree of depression of the needles, the yarn-guide always being in proper position to feed yarn to the needles, whichever way the machine be revolved; and in the employment of two special means for making tight or loose work, either of which, at option, may be used, or both at the same time; and in a construction whereby the needle-cylinder may be readily removed, and another adapted for a different number of needles as readily substituted, without the necessity of changing any of the actuating mechanism of the machine; in a means which, while serving as one of the appliances for adjusting the tightness or looseness of the stitches, also serves as a means for the ready removal of the cylinder, and in other details hereinafter mentioned.

Figure 1 is a perspective view of a machine embodying my improvements. Fig. 2 is a cross-section of the same in the line *x x* of Fig. 1.

A represents the frame or bed of the machine, on which rests the needle cylinder or ring B. The frame has a prolongation or extension, C, so that when the machine is clamped to the ledge of an ordinary table, shelf, or piece of furniture, in the usual manner of hand machines, this extension will, by projecting over and under a considerable surface of the table, afford a firm and steady purchase, thus preventing that unsteadiness and constant shaking which, in driving the machines, have always attended them as usually constructed without such projection. The top also serves as the bobbin or spool support. D is the revolving ring or band, on which is mounted the thread-carrier E, in which is an eye for the yarn, and a slit or opening, F, constructed so as to admit of the ready threading or unthreading of the carrier without breaking the thread, as is very necessary in striped or fancy work. The ring D is caused to revolve by means of a toothed wheel, G, or some other convenient means. The wheel G is driven by a handle, H, the teeth of this wheel engaging with teeth on the ring. Upon the inner face or periphery of ring D is a groove or rest, I, to receive the butts of the needles. This groove or rest, is straight, except at that portion where it is intended to cause the needles to rise or fall, and at that portion it is formed substantially as shown at *a a a* in Fig. 2. Adjustable pieces K, dovetailed, or otherwise so as to admit of being slid or adjusted to various positions upward or downward, serve to vary the character of the cam-grooves and their action upon the needles to change their extent of traverse. The shorter the traverse the closer the stitch, and vice versa. Each of these sliding pieces is held firmly to its desired position by a thumb-screw, L, which, passing through an inclined slot, M, in the ring, serves to lift and lower and fasten the slide in its place. Each slide, also, is fitted in ways, which support or brace it on opposite sides, to prevent its getting out of true position. To each slide may be attached an index or pointer, which, passing through the slot, indicates upon a dial outside the ring the extent to which it has been moved, and consequently the character of the stitch to be made. By having the cam-groove of the same form or shape on each side of its center, and situated alike relatively to corresponding parts of the cam-groove, it is evident that in whichever direction the ring is caused to revolve, the action upon the needles will be unchanged. The needle-ring is grooved in the usual manner, to receive the needles and permit their rise and fall therein; but unlike such ring as shown in my Patent No. 68,595, granted September 10, 1867, it has no groove around its periphery cutting the needle grooves, and no hinged clasp fitting in such groove, and serving to aid in holding the needles in position, and also to hold the revolving cylinder to its place.

In my present invention the revolving cam-ring is held down by clasps N, or their equivalent, which will permit the cams to revolve in either direction.

In order to raise or lower at will the needle-cylinder relatively to the cam-cylinder, I make a screw-thread upon the periphery of the needle-cylinder at its lower end, or make use of some other equivalent means that will answer the same purpose, and I insert in the center of the bottom of the frame a ring-nut, O, having a circular groove, *c*, on its periphery, and which is held in place by several projections, *d*, from the frame, which enter this groove.

The ring-nut is thus free to be revolved; and to facilitate this pins P, serving as handles, project downward from it. These parts act as follows: The needle-cylinder being first screwed into the nut to the proper distance to give it its true position for ordinary work, it may afterward be raised or lowered to the extent desired by simply turning the ring-nut in the direction needed. It will be seen that this provision, which admits of raising and lowering the cylinder, also admits of the ready removal and replacement of the same, or the substitution for it of another having a greater or lesser number of needles, and this without removing or substituting or duplicating any of the operative mechanism, all which remains undisturbed in the machine during this exchange of cylinders, excepting the needles. This feature of raising and lowering the cylinder is of great importance as a simple and efficient means for producing loose or tight work, even when my fixed cam-groove is used; but when used in the same machine with the adjustable cam above described it gives just so much additional range for that purpose beyond that due to the cams alone; in other words, the range is made equal to the range of both added together. For some kinds of work so great a range of adjustment is not necessary, and I then omit the slides from the cams, and have no provision for the adjustment of the cam-groove, which is made continuous, and always the same, the raising and lowering of the cylinder alone serving of itself to give all the adjustment required; or I use the cams for adjustment and have the cylinder stationary. I use two, three, or more bobbins, and a corresponding number of thread-guides, one for each; and I slit each of these from its eye outward, so that in the variety of work which my peculiar improvements enable me to make upon this simplified machine each thread can be instantly removed from or replaced in its eye, or another-colored thread, or two or more threads of the same or different colors, placed therein. These bobbins are placed upon spindles which rise from that portion of the frame which projects over and rests upon the table, so that this projection serves the double purpose of aiding in the firm support of the machine, as before mentioned, and as a convenient but out-of-the-way stand for the bobbins. Usually the spindles for the bobbins are placed upon a loose removable stand, and this is located anywhere the operator may find a place for it, but separate and apart from the machine. The disadvantages of this practice are that the stand is liable to be upset, and consequently the pull upon the thread is variable, being dependent upon where and how the machine may be used, and there is always danger of knots or other obstructions catching and pulling the stand over onto the needles and injuring them, and that neither the bobbins nor yarn-guides always occupied the same relative position to the operative parts of the machine; but by locating them upon and affixing them to the extension-piece C and in permanent positions, the whole apparatus is rendered compact; the bobbin-spindles, bobbins, and their yarn-guides occupy no more area or table room than is required for the machine itself; no extra movable stand or support is needed for them; and they are always in readiness, and always deliver the yarn in the same lines and with the same amount of strain or pull; and in moving the machine from one table or room to another they need not be picked up separately, as heretofore, and the yarn does not get unwound, entangled, or deranged.

This provision for and mode of throwing one thread out, and another thread into, a carrier, so as to make stripes around the work, or to make fancy work, and without the need of breaking off the thread, is of great importance.

Upon the machine constructed as described, I am enabled not only to knit a fabric whose diameter will be equal to that of the ring of the needles, (and which may be made of any size required,) but, by knitting it looser, or with larger yarn, or both, and on all the needles, the diameter is considerably more than when knit tighter; or with finer yarn, or only upon a portion of the needles, others, more or less, at regular or irregular intervals, being omitted.

By knitting only partially around the ring, and then reversing the motion for the same distance, I am enabled to make, upon a circular machine, a straight strip or web, having two finished selvages, or narrow or widen at will.

By knitting such a strip in continuation of a leg of a stocking, (previously knitted upon the machine by the method above described of knitting a tube, and of swelling its size for a calf,) the heel-piece is formed, when a square heel is required; but as a double or thick heel, as well as toe, is generally needed in stockings, to meet the greater wear at those points, I double the work at these parts by simply doubling the thread. The toe is made by continuous narrowing, first of one-half and then of the other half of the toe-piece, and then joining these together by hand.

To make a continuous narrowing—say from the calf to the ankle of a stocking, legging, or gaiter, and at the same time give it a neat, novel, and attractive appearance—I take out of action one needle in front or back of the web, and transfer the loop of such needle to the one next adjacent, and then proceed and knit as many rows as desired, corresponding with the degree of narrowing required, and then take out of action two other needles equally distant from those last removed, and so on, continuously, until the size has been reduced as much as the work demands; and the effect of this operation is to give longitudinal ridges in the work resembling ribbed knitting, the grooves between the ridges growing gradually shorter and shorter as they recede from the longest central one, which should be made to come in front of the stocking or legging.

I also knit upon this machine leggings with gaiter bottoms—an article never before, so far as I am aware, made upon a knitting-machine—and it, with other new products made on my machine, I shall seek protection for in other applications for Letters Patent.

In making mittens upon this machine, the process is mainly the same as in making a stocking.

To make a knitted cord I use two, three, or more needles, and operate the machine, as usual, in one direction, as in knitting tubular goods, each revolution of the ring and its yarn-carrier causing a delivery of the yarn to the barbs of the needles, and then carrying it across from the last to the first needle employed. If the needles used be very few, and the tension be sufficient, a tube will thus be formed, every stitch of which will seem precisely the same, even on a regular family machine; but when it is made small enough, each stitch will be even; but if the needles be more and the tension less in the larger machine, the slack thread passed from the last to the first needle so employed will not be fully taken up, and this portion will present somewhat the appearance of a longitudinal rib in the cord, or a cord flat on one side. If many needles be used, and the machine revolved continuously, the unknitted thread from the last to the first of the needles employed will represent the chord of the arc formed by these needles, and the result will be a knitted puff. If a few only of the needles, at regular intervals, be employed—as, for instance, at four equally distant points—and the machine be continuously revolved in one direction, the result will be a loosely-made tube, the fabricated or knitted part of which will be four equally distant parallel strips, held together by yarn unknitted. By cutting these apart lengthwise it becomes fringe.

By introducing a cord, or wire, or flat strip of metal or other article, at a proper position, so that it may serve as a center about which the thread may pass, it becomes surrounded by and enveloped within the knitted tube, and this process affords a means for covering skirt-wires, whip-handles, window-curtain cord, &c.

By knitting a straight piece with selvage edges, or a tubular piece for muffs, &c., and regularly, at such intervals as may be desired, detaining the yarn upon a pin or otherwise, between the formation of any two stitches, so as to form a loop of whatever length may be desired, or by knitting a course or part of a course, and then throwing the yarn over the same set of needles, and leaving a loose loop between such of the needles as may be preferred, and then knitting another course over these loops, the latter are secured in place, and the result is a rich tufted fabric, with long pile upon one surface of the knitted fabric, and formed of the same yarn which composes its base or foundation.

By making very short loops, which may be done by carrying the yarn over a wire, I make a goods closely resembling ordinary piled fabrics. If this pile be afterward cut, it gives a velvety appearance. If the long tufts be cut, the fabric resembles a Turkey carpet in texture.

Of course, in any of the varieties of work made on this machine different-colored yarns may be thrown in or out, to suit the taste and to vary the pattern.

To make a fancy tippet, I knit regularly a tube as far as desired on all the needles, and then with another-colored yarn knit much tighter or looser on the same number of needles, or knit only upon a lesser number—say upon every other needle. The result is an alternate close and loose mesh, the latter contracting naturally, the product being a new and attractive one.

In knitting a tubular piece, I have successfully surfaced one side of the tube with the long loop or tuft, in the manner above described, and thus formed the outer surface for a knitted muff in imitation of fur. Instead of surfacing the knitted fabric with a tuft of the same material, I have successfully introduced, during the process of knitting, tufts of fur, wool, hair, or silk, which, being held by the stitches, or being curled, make a still closer imitation of natural fur or skins.

In order to form longitudinal stripes in the knitted fabric of a different color from the remainder, I proceed as follows: I allow a certain determined number of stitches to be formed of one colored yarn or thread, and then, bringing into service a yarn of another color, knit as many stitches with it as will give the breadth of stripe desired, throwing the thread which is not in use inside of the work, and so continuing around the circle. The repetition of this for each course will produce the stripes. By continuing such stripes for a distance equal to the breadth of the stripe, and then changing the color of the thread for a corresponding distance in each stripe, a plaid goods will be produced; and these plaids can be made all of a size or not, at option.

It will be readily perceived that with the facilities in my machine for throwing threads in and out of action instantly, and without breaking them to do so, and without tying knots to resume, and by my simple means of instantly reversing, and to any extent, even without the need of any adjustments for that purpose, and of driving the machine in either direction, the range of work it is capable of making is almost unlimited.

I sometimes knit into the goods strips of rubber or elastic cord, or form elastic cord by knitting a covering for strips of rubber. Strips of buckskin I also knit into socks or drawers, and long fibers, such as flocks, silk, &c., I knit into hat and bonnets.

I claim as my improvements in family knitting-machines as follows:

1. In a rotary family knitting-machine, having an adjustable needle-cylinder for lengthening and shortening the stitch, the cam-cylinder provided with the needle guide or groove I, having two equal depressions, *a a*, for drawing down the needles to form the stitch, and one elevating-bend for forcing up the needles, the whole permitting the revolution of the cylinder in either direction.

2. In combination with a needle-cylinder and the cam-cylinder, provided with the needle elevating and depressing cam-groove, the two slides or cams K, for drawing down the needles to form the stitch, all arranged to permit the revolution of the machine in either direction.

3. A longitudinally-grooved needle-cylinder, in combination with a cam-cylinder having an endless cam-groove with two equal and similar bends, and two sliding cam-pieces, one for each bend, and each supported in side bearings or walls, so that proper adjustments may be made to tighten or loosen the stitches, and yet which will permit the revolution of the machine in either direction, to knit tubular or flat goods at will.

4. The combination of an upright needle-cylinder, the frame, and the cam-cylinder, as described, whereby the needle-cylinder may be readily removed without changing any other mechanism than the needles, and another similar cylinder, having more or less needle-grooves, be readily put in its place.

5. A needle-cylinder of a rotary reversible knitting-machine, constructed with a peripheral screw-thread or its equivalent, and combined with a piece engaging with such thread, whereby the cylinder may be raised or lowered to change the character of the fabric while the machine is in action.

6. The combination, with the needle-cylinder, of a ring-nut and detents or projections, adapted to raise or lower such cylinder, and to retain it in any desired position relatively to the cam-cylinder, substantially as and for the purpose described.

7. The combination, in the same machine, of devices, substantially such as described, for varying the cam-groove, with devices, substantially such as described, for raising or lowering the needle-cylinder.

8. A circular family knitting-machine composed of a stationary needle-cylinder and a rotary cam-cylinder whose cams are adapted to operate directly upon the heels of the needles, and are constructed substantially as decribed, so as to permit it to be rotated in either direction, and to knit tubular or flat goods at will, as set forth.

9. In combination, a reversible upright cam-cylinder having adjustable cams, a stationary upright needle-cylinder, a reversible open-eyed yarn-carrier, and a stationary thread-guide, the combination being substantially as shown and described.

DANA BICKFORD.

Witnesses:
JOHN J. HALSTED,
GEORGE T. SMALLWOOD, Jr.